(12) United States Patent
Nagahori et al.

(10) Patent No.: US 6,316,743 B1
(45) Date of Patent: Nov. 13, 2001

(54) LASER PIERCING METHOD, LASER PROCESSING NOZZLE, AND LASER CUTTING APPARATUS

(75) Inventors: Masayuki Nagahori; Shinji Numata; Masato Kawakita, all of Iruma-gun (JP)

(73) Assignee: Tanaka Engineering Works, Ltd., Saitama-Ken (JP)

( * ) Notice: Subject to any disclaimer, the term of this patent is extended or adjusted under 35 U.S.C. 154(b) by 0 days.

(21) Appl. No.: 09/247,620

(22) Filed: Feb. 10, 1999

(30) Foreign Application Priority Data

Sep. 9, 1998 (JP) .................................................. 10-255779

(51) Int. Cl.$^7$ ........................... B23K 26/14; B23K 26/16; B23K 26/00
(52) U.S. Cl. ................................ 219/121.67; 219/121.71; 219/121.72; 219/121.84
(58) Field of Search ......................... 219/121.67, 121.84, 219/121.72, 121.71, 121.83

(56) References Cited

U.S. PATENT DOCUMENTS

| 3,604,890 | * | 9/1971 | Mullaney et al. | 219/121 L |
| 3,761,675 | * | 9/1973 | Mason et al. | 219/121 LM |
| 4,871,897 | * | 10/1989 | Nielsen | 219/121.67 |
| 5,237,150 | * | 8/1993 | Karube | 219/121.72 |
| 5,345,057 | * | 9/1994 | Muller | 218/121.71 |
| 5,374,803 | * | 12/1994 | Yamada | 219/121.72 |
| 5,434,383 | * | 7/1995 | Nakata et al. | 219/121.71 |
| 5,444,211 | * | 8/1995 | Nakata et al. | 219/121.67 |
| 5,539,180 | * | 7/1996 | Mori et al. | 219/121.64 |
| 5,609,781 | * | 3/1997 | Kaga et al. | 219/121.84 |
| 5,770,833 | * | 6/1998 | Kanaoka et al. | 219/121.67 |
| 5,786,561 | * | 7/1998 | Zefferer et al. | 219/121.84 |
| 6,118,097 | * | 10/1993 | Kaga et al. | 219/121.84 |
| 6,124,565 | * | 4/1999 | Morishita et al. | 219/121.67 |

FOREIGN PATENT DOCUMENTS

| 2163692A | * | 3/1986 | (GB) | 219/121.84 |
| 59-87996(A) | | 5/1984 | (JP) . | |
| 64-34579(A) | | 2/1989 | (JP) . | |
| 5-228664(A) | | 9/1993 | (JP) . | |

* cited by examiner

*Primary Examiner*—Tom Dunn
*Assistant Examiner*—L. E Edmondson
(74) *Attorney, Agent, or Firm*—Burns Doane Swecker & Mathis LLP

(57) ABSTRACT

In a piercing operation prior to the laser cutting of steel, etc., the development of a technology in which a piercing hole of the intended shape is obtained in a short time, even for a thick cut work. An oxygen gas coaxial to the laser beam applied towards the cut work and a low concentration gas with a low oxygen concentration and major components comprising nitrogen gas, air, or a mixture thereof discharged from an outer gas nozzle disposed so as to surround the outer side of the flow of this oxygen gas is supplied and disposed towards said cut work, and can realize shortening of the time, etc., of the piercing operation time by applying a laser beam to the cut work. In addition, a laser processing nozzle provided with an inner gas nozzle which discharges oxygen gas and an outer gas nozzle which discharges low concentration gas, and a laser cutting apparatus provided with this nozzle is provided.

9 Claims, 11 Drawing Sheets

LASER PIERCING METHOD, LASER PROCESSING NOZZLE, AND LASER CUTTING APPARATUS

BACKGROUND OF THE INVENTION

1. Field of the Invention

The present invention relates to a laser piercing method, a laser processing nozzle, and a laser cutting apparatus applied in the laser cutting of a cut work, such as a steel plate.

2. Description of the Related Art

In cutting, for example, a thick steel plate (a steal plate with a thickness of 6 mm or greater) by laser, usually the intended cutting operation commences after executing a piercing operation.

Generally, a piercing operation, as shown in FIG. 13, consists in applying a laser beam 2 from a cutting nozzle 1 to the cut work 3, such as a steel plate, heating the cut work 3, and at the same time, by supplying an assist gas 4 which is coaxial to the laser beam 2, forming the piercing hole 5 by removing the molten metal 6 form the heated part of the cut work 3 by the kinetic energy of the assist gas 4. When implementing the piercing operation, part of the molten metal 6 accumulates around the piercing hole 5, and one part is scattered to places separated from the piercing hole 5.

As an assist gas 4, usually oxygen is used. By using oxygen gas when the piercing operation is executed, there is the advantage that the piercing operation can be executed with high efficiency because a high energy is obtained by the oxidation of the molten material due to the oxygen gas. In addition, in the application condition of the laser beam 2 during piercing, the pulsed oscillation is generally equal to or less than 100 Hz, but by increasing the output of the laser beam 2 in a state of continuous oscillation, it is possible to form the intended piercing hole 5 in a short time, and the piercing operation time can be shortened.

However, when increasing the output of the laser beam 2, the problems occur that:

a. the piercing hole 5 diameter increases b. the blowing away the molten metal greatly increases, c. due to b, the cutting nozzle 1 and the focusing lens are sometimes damaged, d. the sputter adhering to the cut work 3 increases, and e. due to d, incomplete cutting is produced when the intended cutting commences.

In addition, in consideration of these problems, in recent years attempts have been made to execute the piercing operation at high speed by raising the peak output of the pulse of the laser beam. However, because the problem of the adhesion of sputter to the lens and nozzle, no basic solution has been found for this problem.

Furthermore, attempts have been made to prevent the blowing away of molten metal and adhering of sputter by controlling the laser beam output during the piercing operation, but the piercing speed follows the control speed, and there are limits to increasing the speed.

Because of the above described situation, it is unavoidable that the piercing operation take a long time for a thick plate in particular. Furthermore, it is difficult to obtain the intended shape of the piercing hole. In order to ensure the passage of the assist gas and the removal of molten metal when switching from piercing to cutting, as well as stabilize the cut at the beginning of the cutting, it is desirable that the cross section and the inner surface of the piercing hole be a perfect circle having a diameter close to the external shape of the laser beam and be smoothly formed. However, in the piercing operation for a thick plate, because the removal of molten metal from the piercing hole during formation is even more difficult, there are many cases in which the diameter of the piercing hole may become extremely large and the shape of the cross section become distorted, and due to the adhering of dross, the inner surface becomes extremely irregular. Thus, when switching from piercing to cutting, the probability of producing an incomplete cut becomes higher. In addition, there is an increase in self burning (sudden local burning of the cut work 3, etc.) at the commencement of the cutting, and the cut becomes unstable. However, as the piercing time becomes long, the amount of heat input into the cut work becomes large during the piercing operation, the cut work becomes heated to a high temperature, and thereby when switching from piercing to cutting, there is excessive melting, and again an the probability of producing an incomplete cut becomes high.

In this manner, in the piercing operation for a thick plate, because it is difficult to obtain the intended shape of the piercing hole and because the cut work is heated to a high temperature due to the long piercing time thereby making excessive melting easily produced, the problems arise that incomplete cutting is easily produced, the cut at the commencement of cutting is unstable, and safely obtaining a high quality cut is not possible.

When executing the piercing operation with a fixed pulsed oscillation, as shown in FIG. 14, with the passage of the piercing time, that is, along with the progress of the piercing, it is clear that the amount of molten metal removed from the piercing hole per unit of time gradually decreases. The cause is that as the piercing hole gradually increases in depth as the piercing operation progresses, it is increasingly difficult for the molten metal inside the piercing hole being formed to be removed to the outside of the cut work. In fact, if the piercing is stopped midway, and the cross section of the piercing hole under formation is observed, it is possible to see that there is a rehardened layer, which was once melted but then hardened again, at the bottom of the piercing hole.

In this manner, if the removal of molten metal produced during the piercing operation is not smoothly removed, there may be an great increase in melting because the piercing operation time becomes lengthened, and in addition to this becoming a vicious cycle, influences the cutting operation which follows the piercing operation.

SUMMARY OF THE INVENTION

In consideration of the above, it is the object of the present invention provide a laser piercing method, a laser processing nozzle, and a laser cutting apparatus which reliably obtain a piercing hole of the intended shape in a short time, and can improve the cutting quality of the cutting after switching from the piercing operation.

By carrying out the piercing operation by applying a laser beam to the cut work while discharging and supplying towards the cut work highly pure oxygen gas, which is discharged coaxially to the laser beam which is applied towards the cutting work and a low concentration gas having a low concentration of oxygen discharged from an outer gas nozzle disposed surrounding the outside of this oxygen gas flow, prevention of excess melting of the cut work and the smooth removal of molten metal can be realized, and by increasing the efficiency of the piercing, the piercing operation time can be shortened. Prevention of excess melting can be realized by supplying a low concentration gas, in particular, by forming an oxygen concentration distribution such that the oxygen concentration in the vicinity of the surface in the piercing hole is lowered. The removal of molten metal from the piercing hole is performed by the high speed flow of the oxygen gas and the low concentration gas.

Because the prevention of excess melting and the smooth removal of molten metal make possible using a continuous oscillation, high output laser beam, the piercing time can be greatly shortened. Furthermore, by the prevention of excess melting and the smooth removal of molten metal, a piercing hole of the intended shape can be reliable obtained.

In this manner, it is possible to reliably obtain in a short time a piercing hole of the intended shape, and furthermore, because heating due to the thermal input to the cut work is greatly decreased, it is possible to realize a smooth commencement of cutting in the cutting operation after piercing, and improving the quality of the cutting.

Technology has been proposed wherein the piercing hole is formed while oxygen gas is supplied and discharged coaxially with the laser beam to the position of application of the laser beam on the cut work, and, for example, nitrogen gas is supplied and discharged as a blow gas from the blow gas nozzle positioned in the vicinity of the side of the cutting nozzle. Technology obtains the piercing hole of the intended shape while blowing away molten metal and sputter, etc., produced during the piercing operation by this glow gas. In this technology, it has been found that if the blow gas is enters the piercing hole during formation, by slightly lowering the oxygen concentration in the piercing hole, the adhesion of dross and the excessive melting of the cut work are suppressed, and a piercing hole of the intended shape can be reliably obtained.

However, in the formation of a piercing hole in a thick plate, such as one having a thickness exceeding 12 mm, the blow gas discharged from the blow nozzle on the side of the nozzle enters the hole with difficulty, and it is difficult for the blow gas to reach the inside of the piercing hole during formation in the cut work. Thus, the effect of preventing the excessive melting by the lowering of the oxygen concentration due to the blow gas with a low oxygen concentration by the cannot be sufficiently obtained. Furthermore, in the blow gas discharged from one side of the cutting nozzle, it is difficult to make the lowering of the oxygen concentration inside the piercing hole uniform, and the uneven distribution of the oxygen concentration in the piercing hole cannot be avoided, and the effect of lowering the oxygen concentration cannot be sufficiently obtained.

In the technology disclosed in prior applications, if the piercing operation is carried out on a thin plate with a thickness of a few millimeters, the effect obtained from lowering the oxygen concentration by a blow gas can be obtained without a problem, but in forming a piercing hole in a thick plate exceeding 12 mm in thickness, there is the problem that the effects of preventing excessive melting and removal of molten metal, etc., by lowering the oxygen concentration is negligible.

The laser piercing method of the present invention is executed before the laser cutting of he cut work, and is characterized in discharging and supplying towards this cut work a highly pure oxygen gas coaxially with the laser beam applied to the cut work, and at the same time, applying to the cut work a laser beam while discharging and supplying to the cut work a low concentration gas having a low oxygen concentration and nitrogen gas, or air, or a mixture thereof as the main components from an outer gas nozzle surrounding the outside of the flow of the oxygen gas.

In this method, because the low concentration gas is used focused in the vicinity of the position of the application of the laser beam to the cut work, the molten metal, sputter, etc., in the vicinity of the position of the application of the laser beam can be blown away, and thereby removed with high efficiency. Furthermore, because this low concentration gas, following the oxygen gas, is supplied at the position of the application of the laser beam, it also enters into the piercing hole under formation by the laser beam, and can remove the molten metal from the piercing hole by blowing it out. Because of this, even if the piercing hole is deep, since the piercing hole is formed while the molten metal is removed from inside the piercing hole with high efficiency, there is no influence of dross, etc., and a piercing hole of the intended shape can be formed even, for example, when a piercing hole is formed in a plate (steel plate) having a thickness exceeding 12 mm.

Generally as an oxygen gas, a highly pure oxygen gas having a purity of 99.5% or greater is used. In addition, a small amount of nitrogen gas, etc., can be mixed into the oxygen gas, as necessary. As a low concentration gas, nitrogen, air, a gas mixture of nitrogen and air, or a gas other than air mixed in nitrogen (oxygen and an inert gas) can be mixed and used as a mixed gas.

The oxygen gas can reach into the interior of the piercing hole even when the piercing hole becomes deep during the progress of its formation, and this can speed the formation of the piercing hole. On the other hand, because low concentration gas enters particularly in the vicinity of the inner surface of the piercing hole during formation and mixes with oxygen gas, there is a tendency for the oxygen concentration to be lowered. Due to this, excess melting of the cut material can be prevented, and as a result in the piercing hole a smooth inner surface is obtained. Because the low concentration gas also, along with the oxygen gas, is supplied and discharged into the piercing hole, it is easy for the gas to reach the interior of the piercing hole, and even when the piercing hole is deep, over the entire piercing hole, it is possible to form the intended oxygen concentration distribution, and the result of reliably preventing excess melting of he cut work can be obtained.

In addition, because the low concentration gas is supplied and discharged from the outer gas nozzle surrounds the oxygen gas, it can act uniformly in the piercing hole, and can lower the oxygen concentration in the vicinity of the inner surface of the piercing hole uniformly. Because of this, the effect of preventing excess melting by lowering the oxygen concentration can be obtained uniformly along the inner surface of the piercing hole, and it is possible to reliably form a piercing hole with intended shape.

Therefore, with this method, even without raising the output at the pulse peak of the laser beam or special output control, the piercing operation for a thick plate can be executed by the same laser beam as a typical piercing operation. In addition, because preventing melting of the cut work and removal of molten metal can be carried out reliably, it is also possible to use a continuous oscillation, high output laser beam, and thereby greatly reduce the piercing time.

When a piercing hole is obtained without the adhesion of dross, etc., and a smooth inner surface, after the formation of the piercing hole, it is possible to commence the cutting operation smoothly, and a smooth cutting surface even in the vicinity where the cutting commenced can be obtained, and a product of superior quality are obtained. Furthermore, if the piercing time is short, because the heat input into the cut work can be reduced, and it is possible to reduce excess melting of the cut work at the commencement of cutting, it is possible to smoothly commence the cutting operation.

In order to reliably obtain the effect of the present invention, as recited in claim 2, it is preferable that the discharge direction of the low concentration gas be inclined towards the center of the oxygen gas discharged towards the cut work. When the direction of the discharge of the low concentration gas is inclined towards the center of the oxygen gas which discharges towards the cut work, it is possible to make the low concentration gas act focus on the piercing hole during formation, and the form of the oxygen concentration distribution in the piercing hole and the removal of molten metal, etc., can be greatly improved, producing a superior result.

In addition, in the present invention, it is possible for the focus position of the laser beam piercing applied to the cut work during piercing to be different during the later cutting operation, and the distance of the separation of the laser processing nozzle with respect to the cut work to be different during the later cutting operation, and thereby during piercing or cutting, the optimal laser beam focus position and nozzle position can be obtained.

In addition, the laser processing nozzle used in order to realize the above-described laser piercing method, as recited in claim 9, is used in a laser piercing operation carried out before the laser cutting of a cut work, and is characterized in providing an inner gas nozzle that the laser beam applied to the cut work passes through and discharges a high purity oxygen gas towards the cut work coaxially to the laser beam, and an outer gas nozzle which is provided surrounding the outer side of the inner gas nozzle, and supplies and discharges towards the cut work a low concentration gas having a low oxygen concentration and a nitrogen gas, air, or a mixture thereof as main components.

This laser processing nozzle is generally used not only for laser piercing operation, but for laser cutting.

Moreover, in order to obtain the effect of the present invention more reliably, as recited in claim 10, it is preferable that the vicinity of the opening of the outer gas nozzle be inclined so that the discharge direction of the low concentration gas is inclined towards the center of the oxygen gas flow discharging towards the cut work.

In addition, the laser cutting device recited in claim 11 is characterized by being equipped with the laser processing nozzle recited in claim 9.

In this invention, providing an oil application mechanism which applies oil to the cut work (claim 12), providing a lens drive mechanism which alters the focus position of the laser beam by moving the lens based on data provided in advance (claim 13), providing a contouring mechanism which automatically controls the separation distance of the laser processing nozzle with respect to the cut work based on this data provided in advance (claim 14), and providing a nitrogen concentration controlling mechanism which controls the nitrogen concentration in the low concentration gas by mixing oxygen gas with a low concentration gas discharging from the outer gas nozzle are more preferable. Moreover, in the area of the position intended for piercing, before application of the laser beam, oil is applied in advance, and thereby it is possible to prevent the adhering of sputter and molten metal scattered in the piercing operation to the cut work. Thus, when moving from the piercing operation to the cutting operation, damage to the cutting by the sputter and the molten metal can be avoided, thereby producing a produce of superior quality.

DESCRIPTION OF PREFERRED EMBODIMENTS

Figure 1:
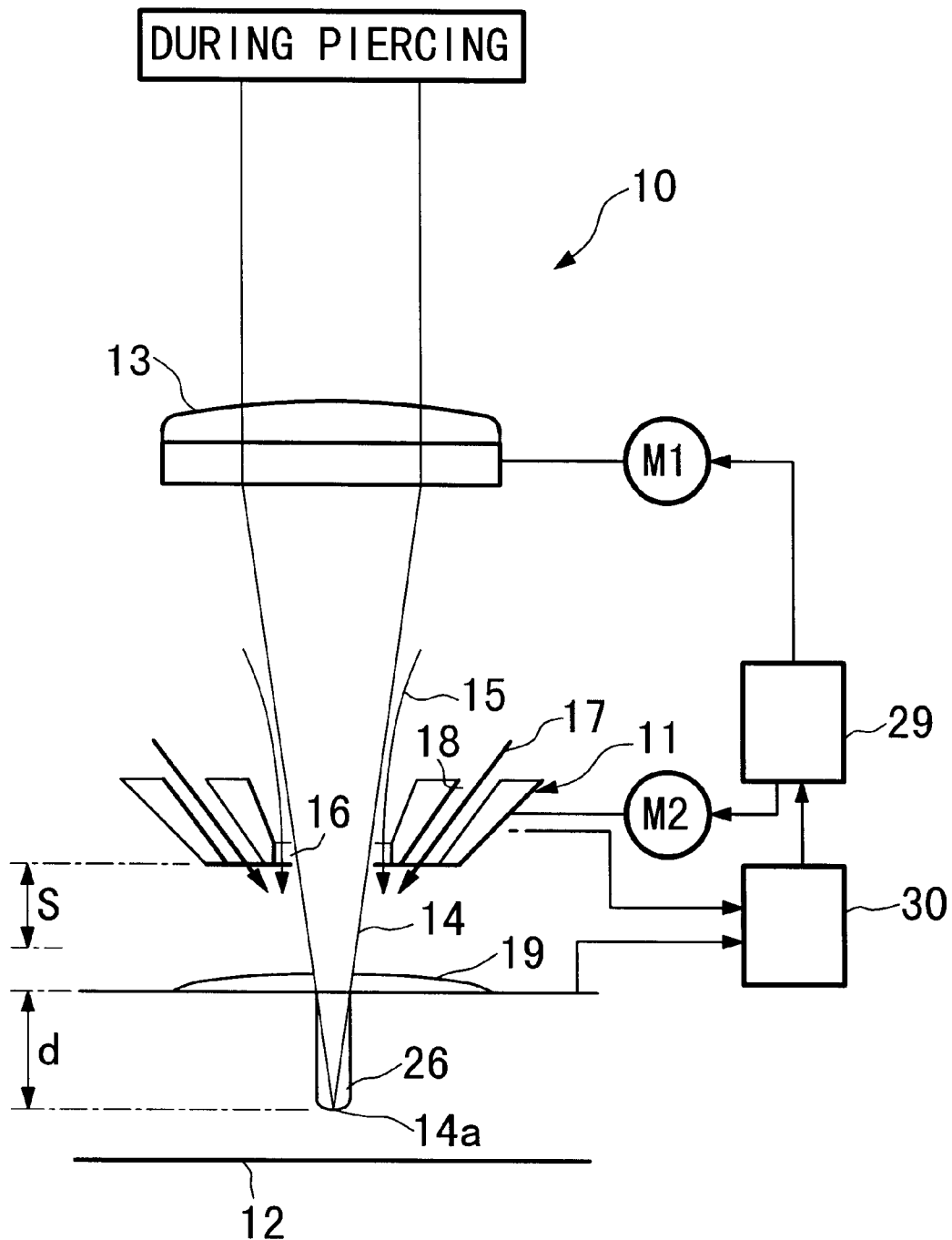
FIG. 1 is a frontal view showing diagrammatically the vicinity of the processing head of the laser cutting apparatus during the piercing operation of the first embodiment of the present invention.

Below, an embodiment of the present invention referring to the drawings.

Figure 2:
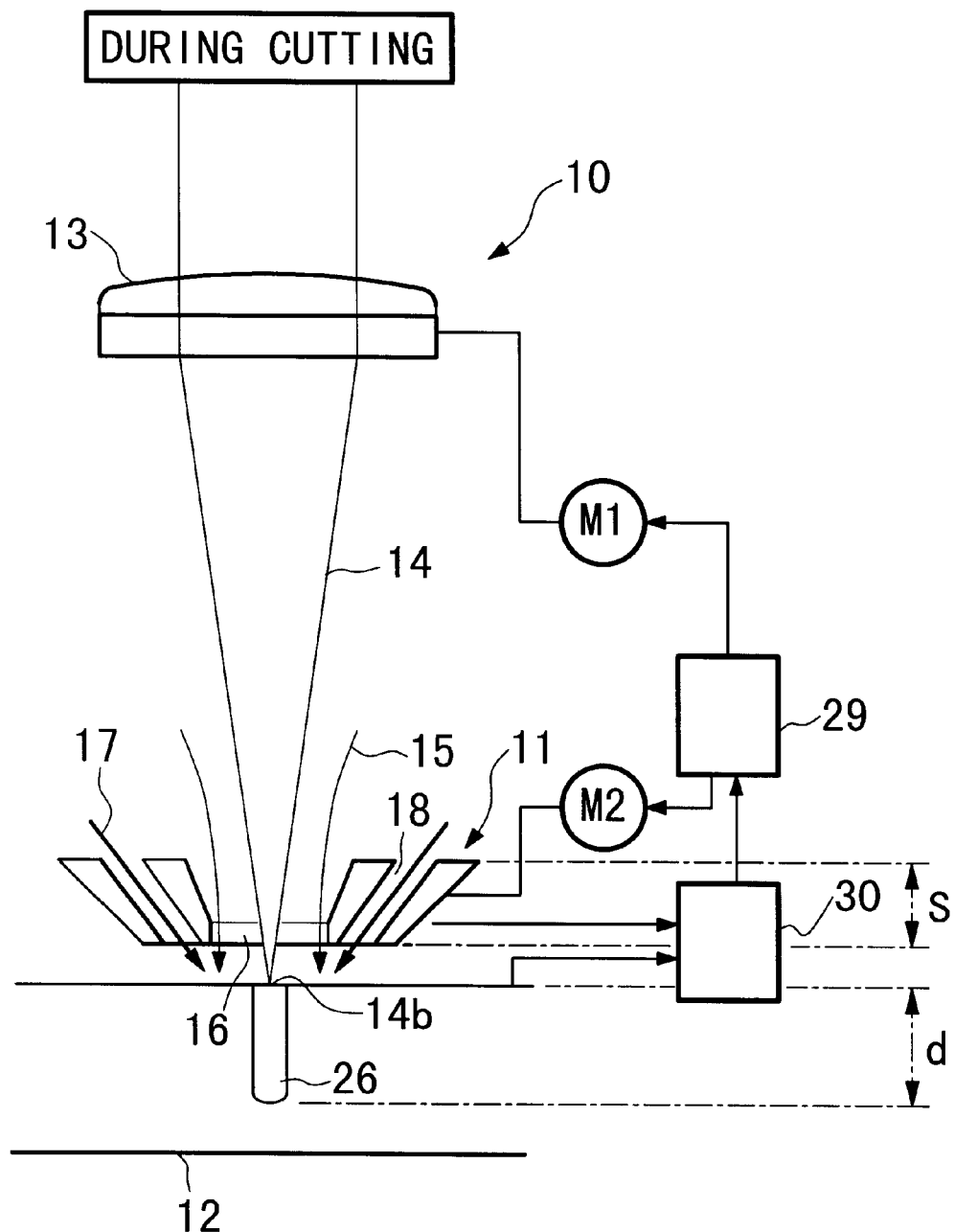
FIG. 2 is a frontal view showing diagrammatically the vicinity of the processing head of the laser cutting apparatus during the cutting operation of the first embodiment of the present invention.

FIG. 1 and FIG. 2 are frontal views showing the vicinity of the processing head 10 of the laser cutting apparatus; FIG. 1 is during piercing, and FIG. 2 is during cutting.

In FIG. 1, in the laser piercing operation using this laser cutting apparatus is carried out by raising and lowering the laser processing nozzle 11 (hereinafter, abbreviated as "nozzle") by activating the nozzle activation mechanism M2, and positioning it at an appropriate position approaching the cut work 12 horizontally positioned below, and at the same time, by raining and lowering the lens 13 by activating the lens activation mechanism M1, positioning it where the laser beam applied to this cut work converges sop as to join the focal point of the cut work 12.

Figure 3:
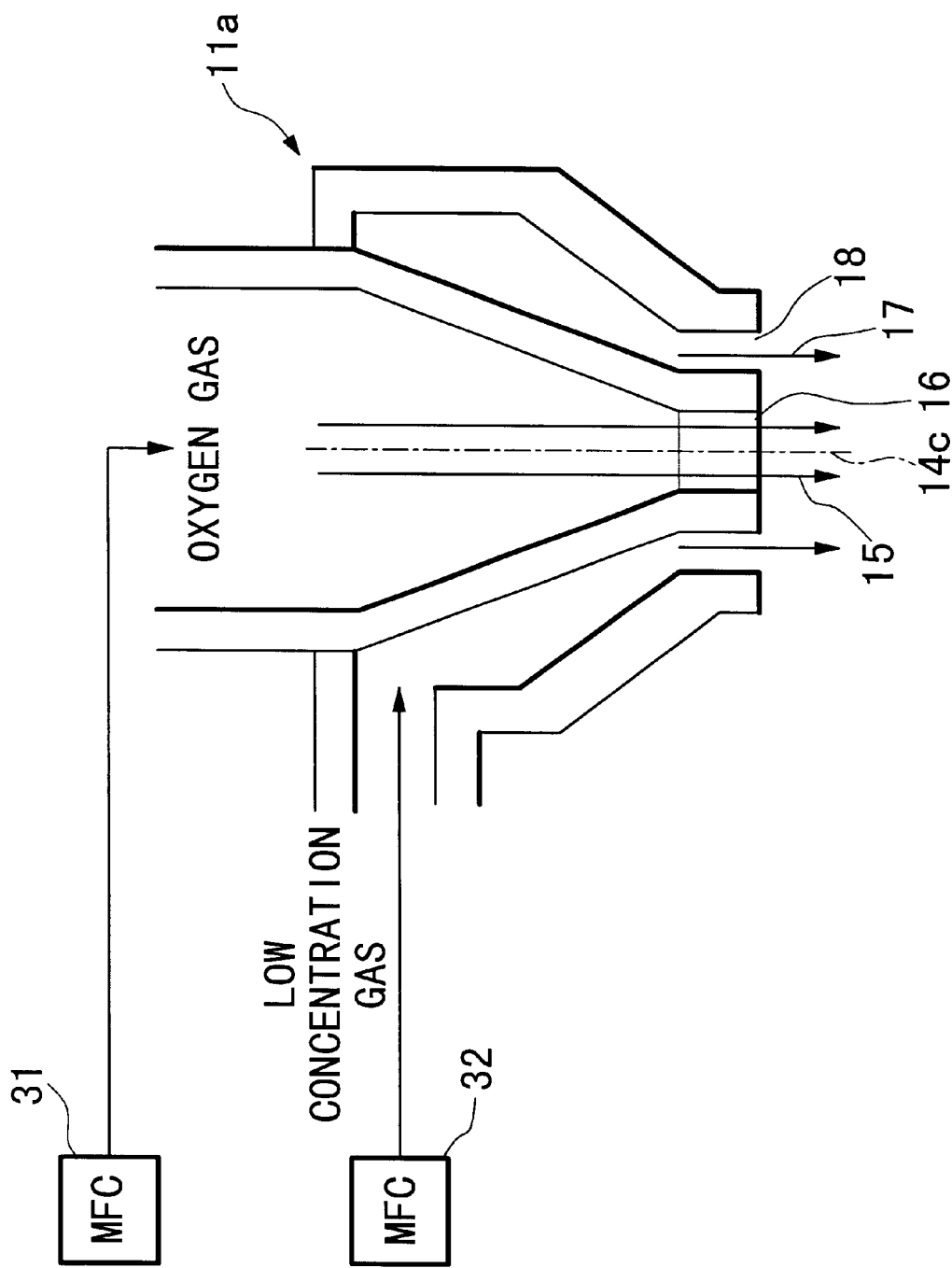
FIG. 3 is a frontal cross-section showing an example of the laser processing nozzle applied to laser cutting apparatus of FIG. 1.

FIG. 3 is a cross-section showing a nozzle 11a which is an example of the nozzle 11.

In FIG. 3, the nozzle 11a provides an inner gas nozzle 16 through which the laser beam 14 (not shown in FIG. 3)

passes, and which discharges highly pure (99.5% or greater) oxygen gas 15 towards the cut work 12 coaxially to the laser beam 14 (not shown in FIG. 3), and an outer gas nozzle 18 which surrounds the outside of the inner gas nozzle 16, and supplies and discharges towards the cut work 12 a low concentration gas 17 having a low oxygen concentration with nitrogen gas, air, or a mixture thereof as main components. The optical axis of the laser beam 14 nearly agrees with the central axis of the inner gas nozzle 16. The outer gas nozzle 18 is concentric to the inner gas nozzle 15. Therefore, in this nozzle 11a, the oxygen gas 15 and the low concentration gas 17 from the interior and exterior gas nozzles 15 and 18 is supplied and discharged parallel to each other towards the cut work 12.

In FIG. 3, the mass flow controller (hereinbelow, abbreviated as "MFC") 31 controls the amount of flow of the mass flow of the oxygen gas 15 discharged from the inner gas nozzle 16, and the mass flow controller (hereinbelow, abbreviated "MFC") 32 controls the amount of the mass flow of the low concentration gas 17 which is discharged from the outer gas nozzle 18.

Figure 4:
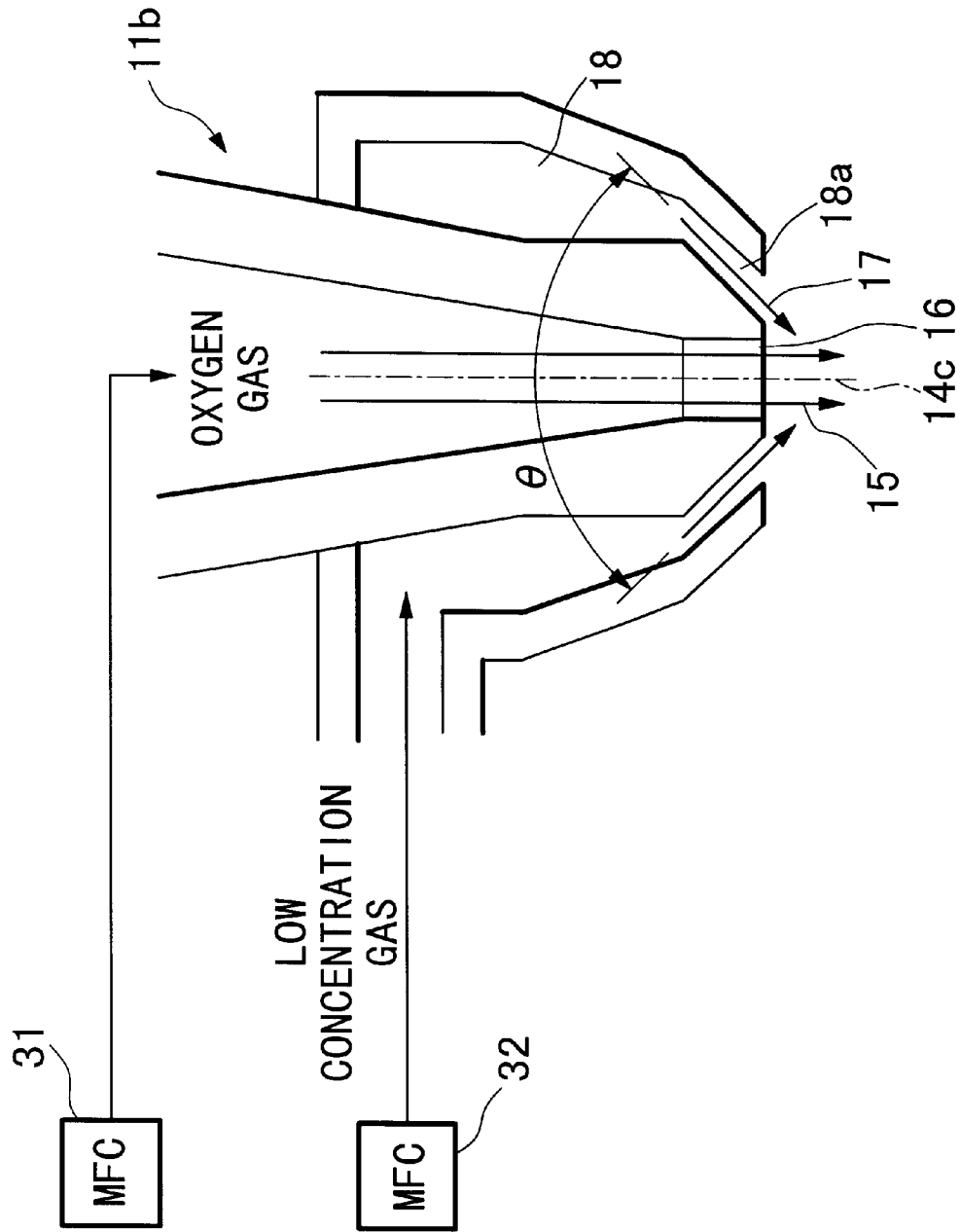
FIG. 4 is a frontal cross-section showing another example of a laser processing nozzle applying the laser cutting apparatus of FIG. 1.

FIG. 4 is a cross-section showing a nozzle 11b which is another example of the nozzle 11.

In FIG. 4, the nozzle 11b slopes in the vicinity of the opening 18a of the outer gas nozzle 18 in the nozzle 11a, and the direction of the discharge of the low concentration gas 17 inclines toward the center of the oxygen gas flow 15 which is discharged towards the cut work 12. The other parts of the nozzle 11b are formed in the same manner as nozzle 11a.

By this nozzle 11b, the low concentration gas 17 discharged from the outer gas nozzle 18 mixes with the oxygen gas 15 discharged from the inner gas nozzle 16, and reaches the cut work 12.

Figure 5:
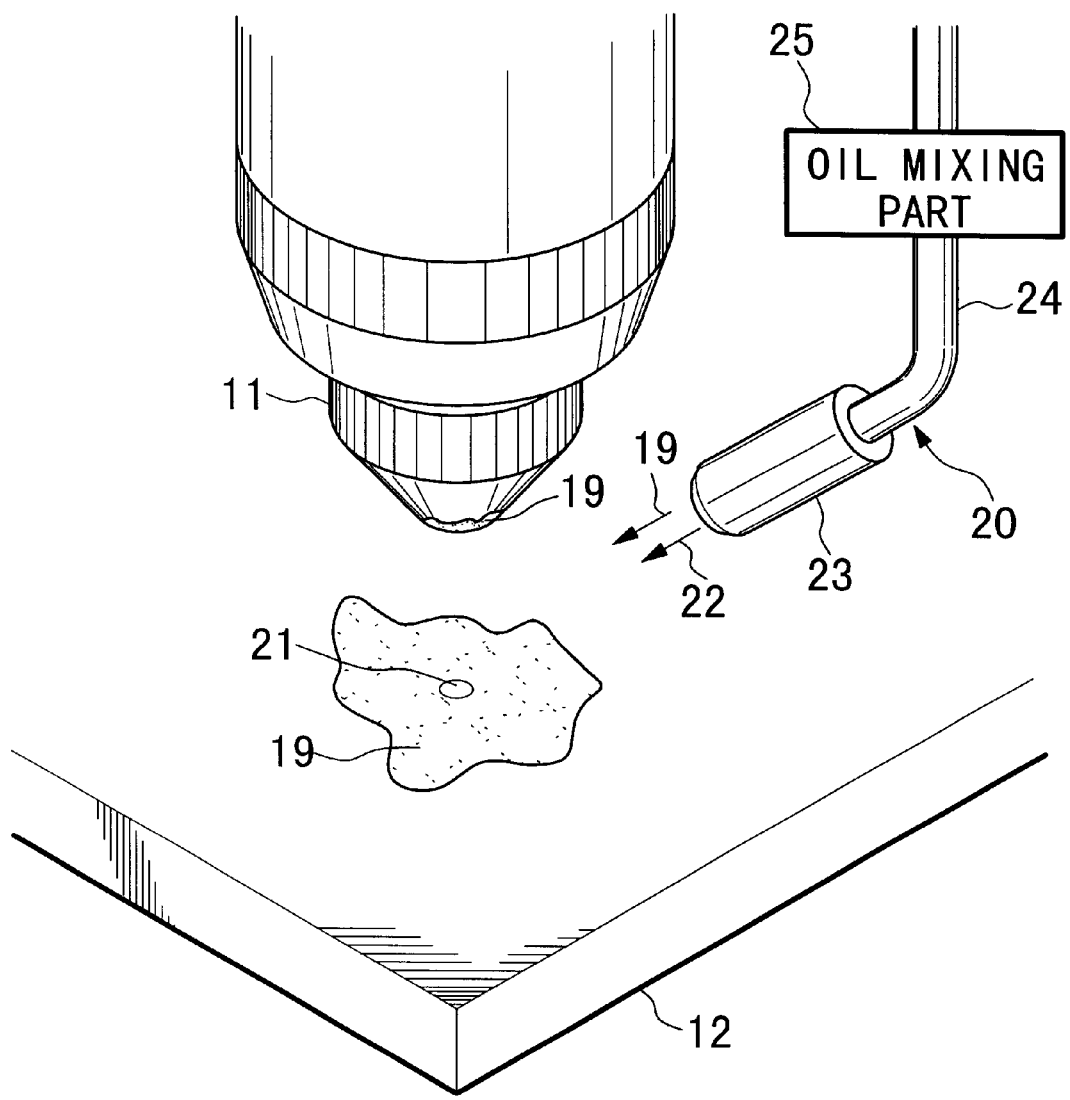
FIG. 5 is a frontal view showing an example of the laser processing nozzle and the oil applying mechanism applying the laser cutting apparatus of FIG. 1.

As shown in FIG. 5, at the side of the nozzle 11, an oil application mechanism 20 which applies oil 19 to the cut work 12 is provided. In FIG. 5, the oil application mechanism 20 provides a blow nozzle 23 which is disposed adjacent to the side of the nozzle 11, faces the intended piercing position 21 of the cut work 21, and discharges blow gas 22, and in the oil mixing part 25 which is provided at a position on the blow gas pipe 24 supplying bow gas 22 to this blow nozzle 23, atomized oil 19 is mixed with the blow gas 21. In addition, when blow gas 22 is discharged towards the intended piercing position 21, the oil 19 mixed therein is applied by blowing to the cut work, along with the blow gas 22. Because the blow gas 22 makes contact with the cut work in the vicinity of the intended piercing position 21, the oil 19 in the blow gas 22 is applied in this range.

The oil application mechanism 20 is operated before the commencement of the piercing operation 21, and the oil 19 is applied on the cut work 12 in the vicinity of the intended piercing position and to the lower end of the nozzle 11. After the application of oil 19 is complete, by a moving mechanism not shown in the figure, the oil application mechanism 20 is quickly shunted to a position separated from the nozzle 11. By the shunting being carried out before the piercing operation, the sputter and molten metal produced by the piercing operation is prevented from adhering to the blow nozzle 23, clogging of the blow nozzle 23, etc., is prevented, and the oil applying capacity of the oil application mechanism 20 is maintained. After the piercing operation, when the laser cutting apparatus starts the piercing operation, the oil application mechanism 20 is again disposed at the plow position at the side of the nozzle 11 by the moving mechanism.

Moreover, as an oil mixing part 25, it is possible to use several kinds of construction.

As shown in FIG. 1, in the piercing operation, while a low concentration gas 17 with a low concentration of oxygen is discharged towards the cut work 12 from the outer gas nozzle 18 disposed surrounding the outside of the flow of the oxygen gas 15 along with the oxygen gas 15 from the inner gas nozzle 16 being supplied and discharged towards the cut work 12, the laser beam 14 is applied to the cut work 12. In FIG. 1, the piercing focal point position 14a of the laser beam 14 is at the center part in the direction of the thickness of the cutwork 12.

Figure 6:
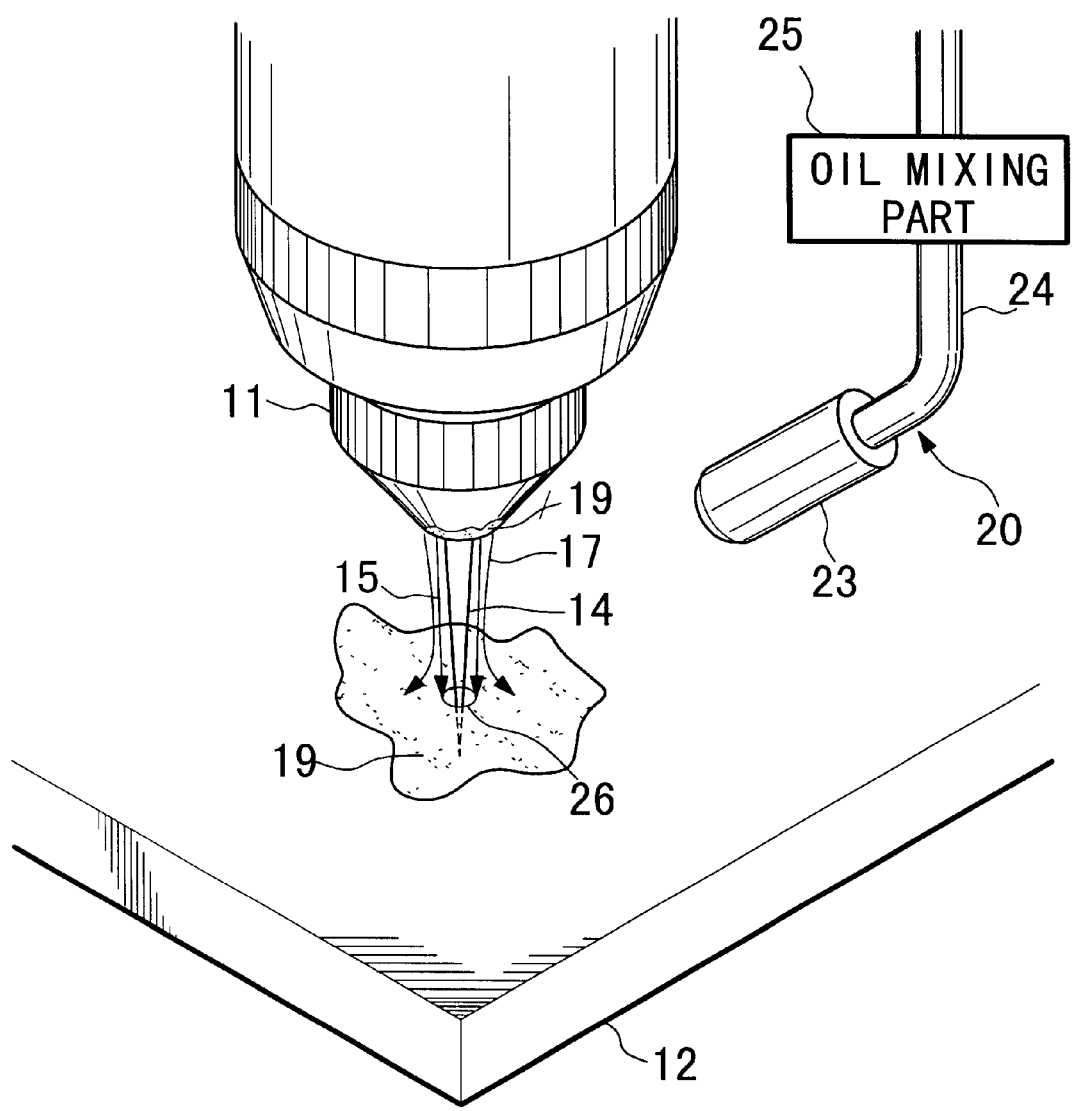
FIG. 6 is a perspective view showing the vicinity of the piercing hole during formation in the laser cutting apparatus of FIG. 1.

As shown in FIG. 6, the gases 15 and 17 discharged from both gas nozzles 16 and 18 of nozzle 11 are used concentrated in the vicinity of the piercing hole 26 during formation at the intended piercing position 21, and both go into the piercing hole 26. Due to this, because the sputter and the molten metal produced by the piercing operation are rapidly removed from the piercing hole 26 by the gases 15 and 17, adhesion of the sputter and molten metal inside the piercing hole is prevented, and a piercing hole 26 of the intended shape can be reliably obtained. In addition, the sputter and the molten metal are prevented form entering the process head 10 from the nozzle 11 and adhering to the lens 13.

The center of the inside of the piercing hole 26 during formation obtains a high oxygen concentration due to the oxygen gas 15 discharged from the inner gas nozzle 16, and the formation of the piercing hole 26 is promoted. In contrast, in the vicinity of the inner surface of the piercing hole 26, by the low concentration gas 17 discharged from the outer gas nozzle 18 being mixed with the oxygen gas 15, the oxygen concentration is lowered, excess melting of the cut work 12 can be prevented, and a smooth inner surface obtained. Because the low concentration gas 17 is supplied and discharged uniformly from the outer gas nozzle 18 surrounding the vicinity of the outside of the inner gas nozzle 16, the oxygen concentration is uniformly lowered in the area around the inner surface of the piercing hole 26. Because of this, in the piercing hole 26, a smooth surface is uniformly obtained, and a small round piercing hole 26 having a shape almost the same as the outer shape of the laser beam 14 can be reliably obtained.

The excess melting of the cut work 12 in the vicinity of the inner surface of the piercing hole 26 being prevented means that only a small amount of molten metal must be removed from the piercing hole 26, and this itself contributes to shortening the piercing time.

In this manner, because the removal of the sputter and molten metal from the piercing hole 26 is very efficient and further excess melting is prevented by the oxygen concentration distribution, it is possible to use a continuous oscillation, high output laser beam 14, and by this laser beam 14, a piercing hole 26 of the intended shape can be formed efficiently in a short time.

When the small piercing hole 26 is formed in a short time, the heat input to the cut work 12 can be reduced. Therefore, even moving to the laser cutting of the cut work 12 continuously after the completion of the piercing operation, it is possible to reduce excess melting of the cut work 12 in the vicinity of the piercing hole 26, and a smooth cut surface can be obtained even in the vicinity of the position of the commencement of the cutting, and thereby the quality of the cut can be improved. Furthermore, by the above-described piercing operation, in the piercing hole 26, because the intended shape can be reliably obtained, incomplete cuts can be prevented and the laser cutting can always commence smoothly.

Because oil 19 is applied in advance, before the piercing operation, by the oil applying mechanism 20 to the cut work 12 in the vicinity of the intended piercing position 21 and lower part of the nozzle 11, it is possible to prevent adhesion of sputter and scattered molten metal produced by the piercing operation. If the adhesion sputter and molten metal on the cut work 12 can be prevented, damage to the other operations, such as cutting, by this sputter and molten metal can be prevented. If adhesion of the sputter and molten metal to the nozzle 11 can be prevented, clogging of the gas nozzles 16 and 18, etc., can be prevented.

Figure 7:
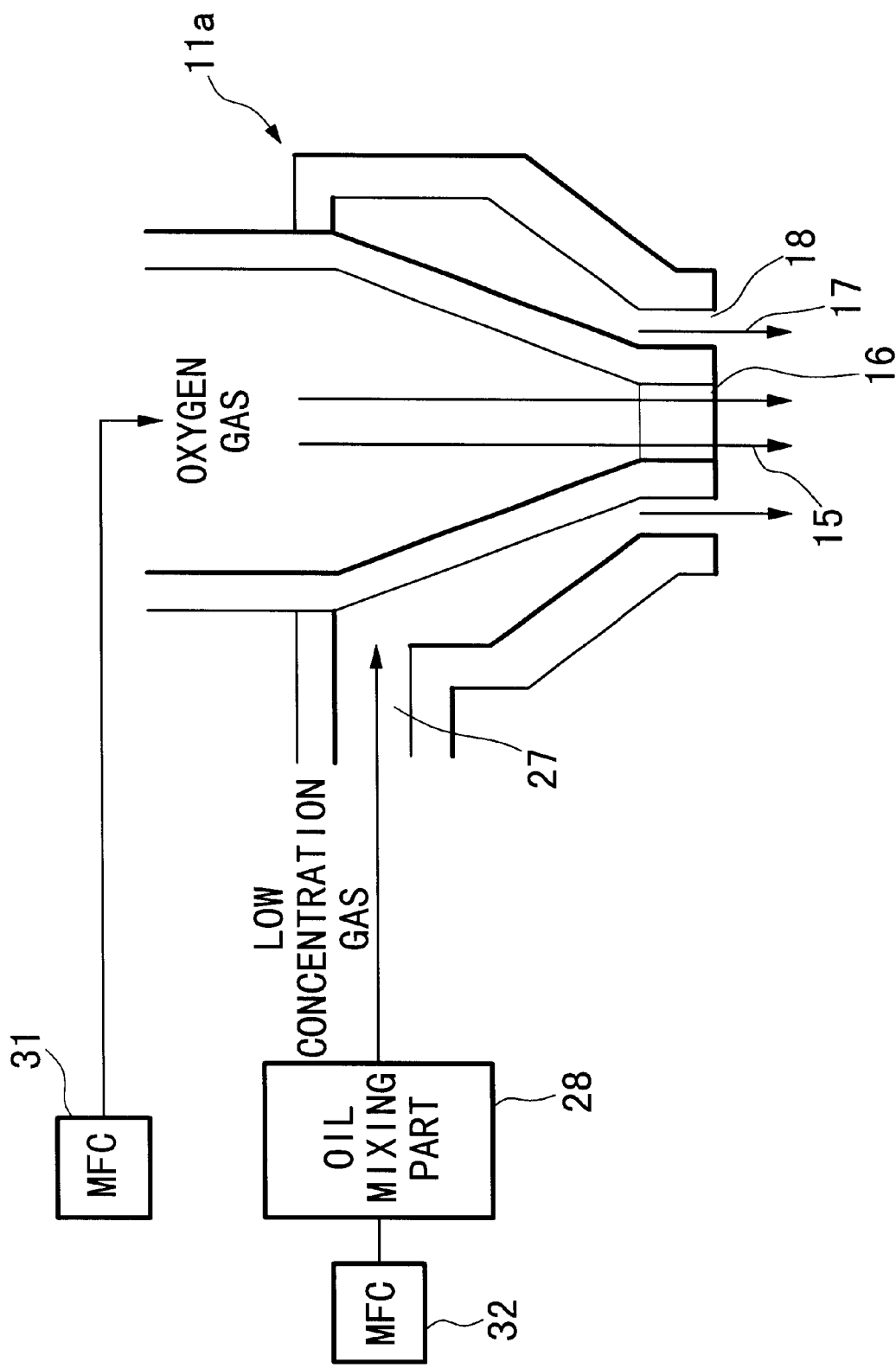
FIG. 7 is a frontal view showing the laser processing nozzle furnished with an oil application apparatus which mixes oil with a low concentration gas discharged from the outer gas nozzle.

Moreover, as an oil applying mechanism, as shown in FIG. 7, it is possible to use a structure wherein an oil mixing part 28 which mixes atomized oil 19 with low concentration gas 17 can be provided on the gas flow path 27 which supplies the low concentration gas 17 to the outer gas nozzle 18. In this oil application mechanism, it is possible to apply oil 19 to the nozzle II and to the cut work 12 in the vicinity of the intended piercing position 21, and there is almost no hindrance to stably obtaining a high quality cut.

In FIG. 2, in the laser cutting operation, the nozzle 11 is lowered to only a distance s (see FIG. 1) from the position during the piercing operation by activating the nozzle drive mechanism M2, the lens 13 is raised only distance d (see FIG. 1) by the lens drive mechanism M1, and the focus position of the laser beam 14 is moved (raised) to a predetermined cutting focus position 14b, which is higher than the piercing focus position 14a (see FIG. 1). This cutting focus position 14b assumes application to a plate having a thickness from several mm to a maximum of 25 mm, and generally it is set in the vicinity of the upper surface of the cut work 12. In addition, while oxygen gases 15, 17 are discharged from the gas nozzles 16, 18 on both the inner and outer sides of the nozzle 11, the laser beam 14 is applied to the cut work 12, and by moving the processing head 10 horizontally along the cut work 12, cutting is carried out.

In the movement from the piercing operation to the cutting operation, the height of the nozzle 11 and the lens 13 can be changed, and nozzle 11 can be used as-is without being exchanged. After completion of the piercing operation, the processing head 10 can begin the cutting operation after the nozzle 11 is positioned with respect too the piercing hole 26.

The activation of the mechanism (not shown) which moves the lens drive mechanism M1, the nozzle drive mechanism M2, and the processing head 20 is controlled by the drive control unit 29. The control of the height of the nozzle 11 and the lens 13 is based on data prerecorded in the drive control unit 29, and is automatic.

The drive control unit 29 in FIG. 1 and FIG. 2 forms a contouring mechanism which automatically positions the nozzle 11 at the intended height from the cut work 12. As this contouring mechanism, for example, a static electricity capacity formula which maintains the static electricity capacity between the nozzle 11 and the cut work 12 at a constant, or a differential pressure formula which maintains the gas pressure formed between the nozzle and the cut work 12 by the gas blowing from the nozzle 11 to the work 12 at a constant can be used, and in either construction, the detection value of the nozzle 11 from the cut work 12 detected in the height detection unit 30 is input into the drive control unit 29, and thereby the nozzle 11 is automatically controlled so as to be at a preset intended height.

For example, in moving from the piercing operation to the cutting operation, by activating the lens drive mechanism M1 and the nozzle drive mechanism M2 based on a command from the drive control unit 29 while referencing the detected value from the height detection unit 30, the lens 13 is raised and the nozzle 11 is lowered, and both are respectively automatically disposed at a predetermined height from the cut work 12. Contrariwise, in moving from the cutting to piercing, the lens 13 is lowered, and the focus position is moved to a piercing focus position 14a below only the distance d which is set with respect to the cutting focus position 14b, the nozzle 11 is raised.

Because the moving distance d between the focus positions 14a and 14b changes according to the plate thickness of the cut work 12, even if the plate thickness of the cut work 12 changes, with respect to the cutting focus position 14b which is constant, the piercing focus position 14a automatically changes with each of the plate thicknesses of the cut works 12.

In this manner, whenever there is a piercing operation, the piercing focus position 14a is not set with the upper surface of the cut work 12 as the standard position, but the cutting focus position 14b, which set in advance the upper surface of the cut work 12 as the standard position, is set as the standard, and if data about the thickness of the cut work 12 is input in addition to the cutting focus position 14b which is set in advance, the piercing focus position 14a is automatically set. An arbitrary point of the expected cutting position (not shown) which extends a long distance on the cut work 12 in comparison with the expected piercing position is made the standard, and simply by setting the cutting focus position 14b, even if the expected piercing position 21 (see FIG. 5) is a position at the edge or a corner of the cut work 12, it is possible to easily set the intended piercing focus position 14a.

Figure 8:
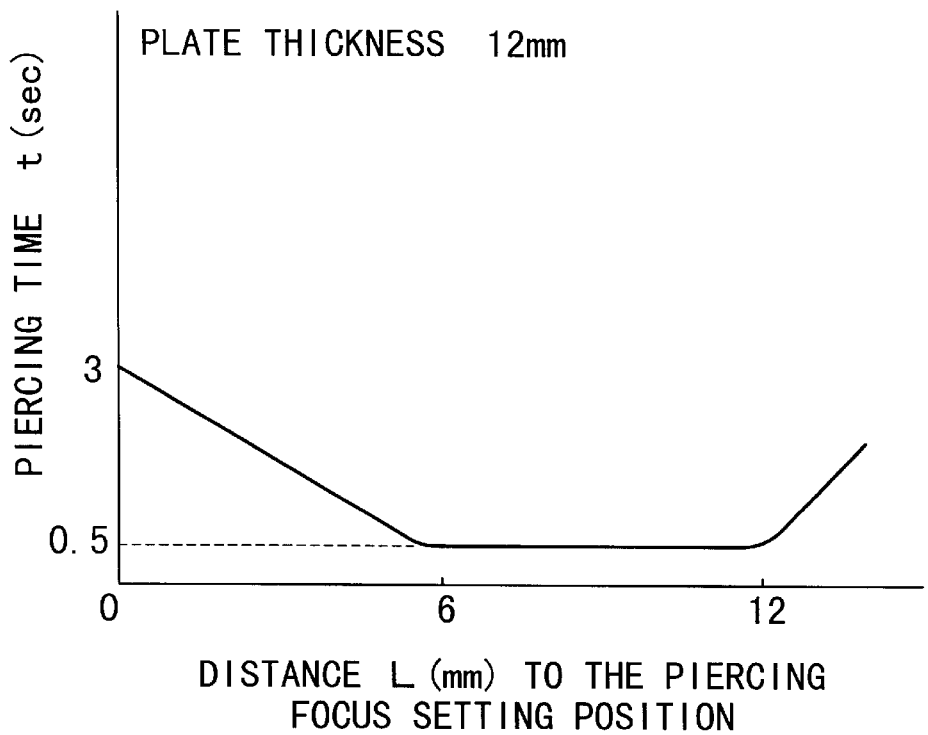
FIG. 8 is a graph showing the relationship between the piercing time and the distance L from the cut work surface to the piercing focus position.
Figure 9:
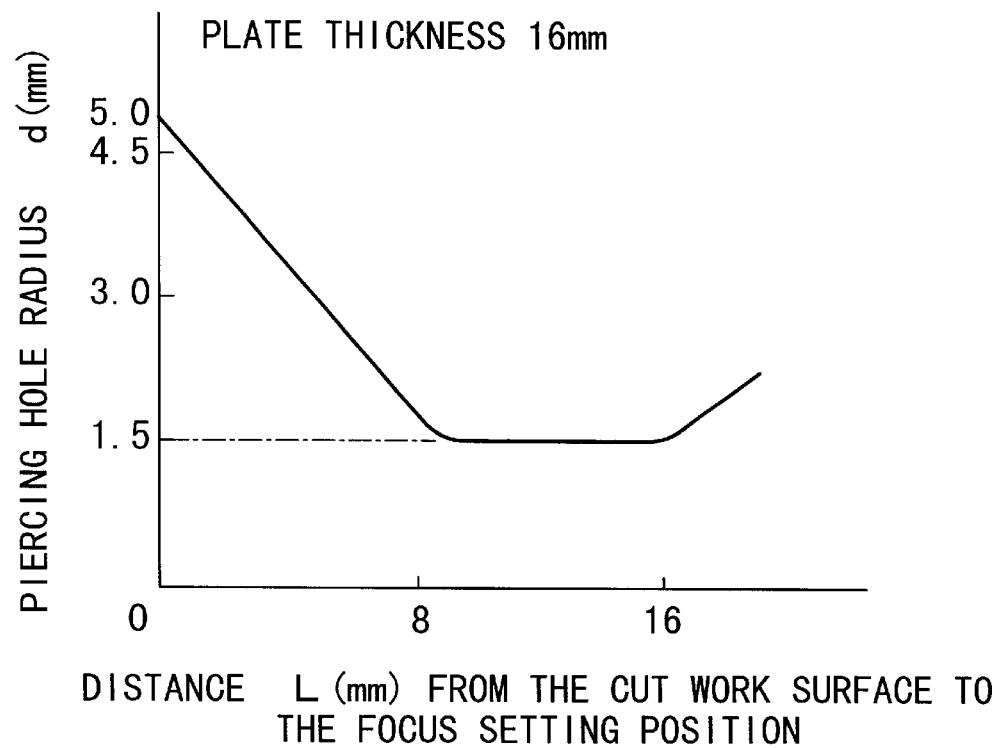
FIG. 9 is a graph showing the relationship between the piercing diameter and the distance L from the cut work surface to the piercing focus position.

As shown in FIG. 8 and FIG. 9, if the distance L from the surface (upper surface) of the cut work 12 to the piercing focus position 14a is too large or too small, the effects of reduction of piercing time and the reduction of the radius of the formed piercing hole 26 cannot be sufficiently obtained. Therefore, the present inventors searched for the optimal range of the distance L.

For example, as shown in FIG. 8, for a cut work 12 with a plate thickness of 12 mm, in order to reduce the piercing time, a range of 6~12 mm for the distance L is optimal, and as shown in FIG. 9, for a cut work 12 with a plate thickness of 16 mm, in order to minimize the radius of the piercing hole 16, a range of 8~16 mm for the distance L is optimal. In addition, as a result of finding these conditions, the inventors discovered that the distance L which obtains both the effects of reducing piercing time and minimizing the radius of the piercing hole 26 is the range of ½ t~1 t (the same as the half the thickness of the plate or greater), when the plate thickness t of the cut work 12 is the standard.

Figure 10:
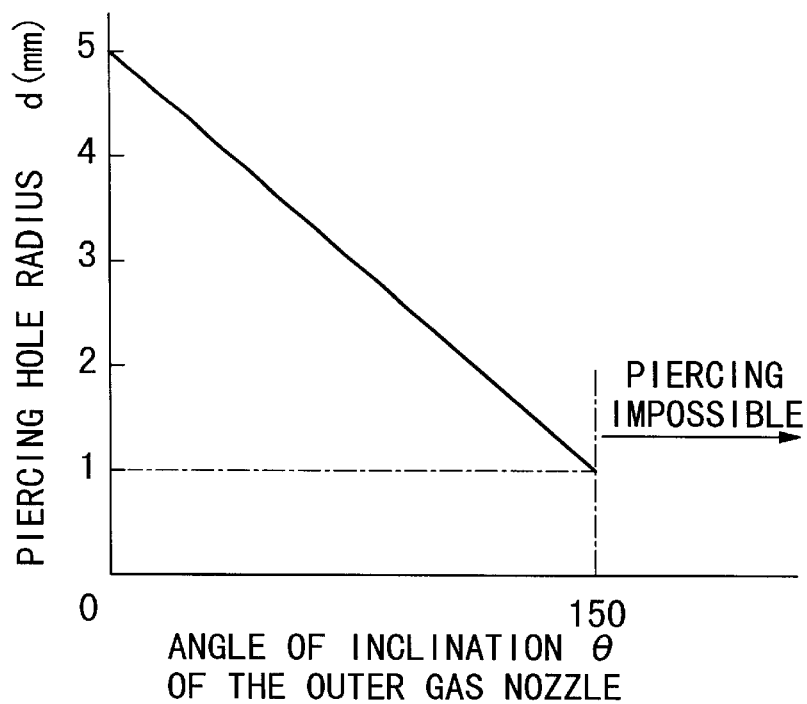
FIG. 10 is a graph showing the relationship between the piercing diameter and the angle of inclination 0 in the vicinity of the opening of the outer gas nozzle.

The nozzle 11b shown in FIG. 4 is superior in that it focuses the low concentration gas 17 with high efficiency on the piercing hole 26 during its formation by discharging low concentration gas 17 from the outer gas nozzle 18 which is inclined. The angle of inclination θ within the outer gas discharge nozzle 18 facing both sides of this nozzle 11b in the radial direction, as is shown in FIG. 10, is optimal at 150° or a somewhat smaller angle. At this angle θ, it is possible to realize reliably the two points of removing with high efficiency sputter and molten metal from the within piercing hole 26 during formation, and obtaining the intended oxygen concentration within the piercing hole 26. Moreover, in FIG. 10, the larger the angle θ, it is possible to make the radius of the forming piercing hole 26 smaller. However, when the angle θ exceeds 150° (the angle of inclination with respect to the surface of the cut work 12 is less than 30°), piercing becomes impossible, and 150° was identified as the upper limit for the angle θ.

Moreover, when the piercing hole 26 is particularly deep, by making the angle θ small, the low concentration gas 17 could be made to reach the interior of the piercing hole 26. For example, when using a different nozzle than nozzle 11b, it is easy to make the angle of inclination with respect to the upper surface of the cut work 12 small, but in consideration of interference, etc., with the nozzle 11b, because there is a limit in increasing the angle of inclination with respect to the upper surface of the cut work 12, on this point, the present embodiment is superior.

Figure 11:
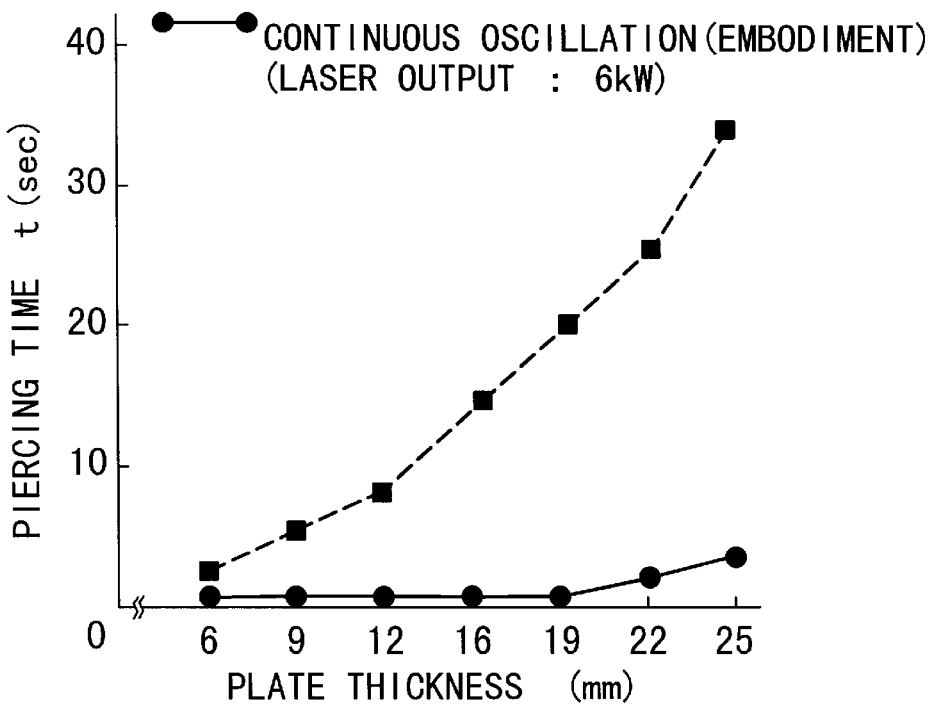
FIG. 11 is a graph comparing the piercing time with the continuous oscillation of a laser beam and a pulsed oscillation of a laser beam.

In FIG. 11, as an embodiment, under the conditions of the above separation L and the angle of inclination θ, the height of the nozzle 11 during piercing was set to a height s=3 mm (see FIG. 1 and FIG. 2 for s) higher than the nozzle 11 during cutting, and using a 6 kW output laser beam output by continuous oscillation, a piercing operation was carried out on a steel plate comprising soft steel. In addition, as a comparison example, under the same condition of separation L, a piercing operation was carried out using a 4.5 kW output laser beam output with pulse oscillation and a duty ratio of 20%. Comparing both of these, in a range of plate thickness of 6~25 m, it is clear that the embodiment 1 could considerably reduce the piercing time in comparison to the comparison example.

For example, in an experiment conducted by the present inventors, using the laser beam 14 of the above embodiment, when carrying out piercing on a cut work 12 with a thickness of 6~22 mm, the formation of the piercing hole 26 was completed in 0.25 sec. At this time, the energy applied to the cut work 12 was 6,000×2.5=1500 J.

In contrast, using a 4500 W out laser beam with pulse oscillation and a duty ratio of 20%, in the same manner the piercing of the cut work with a thickness of 12 mm, the formation of the pierce hole was completed in 8 seconds. At this time, the energy applied to the cut work 12 was 4500×0.2×8=7200 J.

In the embodiment and comparison example 2, in spite of the fact that the largeness (amount of removed metal) of the formed piercing holes was almost identical, it was found that there was a difference of several times in the amount of input heat to the cut work 12, and in the piercing of the embodiment, the input heat to the cut work 12 was less than one-fourth that of the comparison example 2.

In addition, in the embodiment, from the formed piercing hole 26, when a continuous cutting operation was commenced, there was no occurrence of self-burning, and it was possible to carry out stable cutting reliably.

In this manner, according to the form of the present embodiment, by using a nozzle 11 formed by the double concentric inner and outer gas nozzles 16 and 18, and discharging and supplying towards the cut work 12 and oxygen gas which is coaxial to the laser beam 14 and a low concentration gas 17 so as to surround it, the piercing hole 26 of the intended shape can be obtained with a reduced piercing time and having a smooth inner surface. By surrounding the outside of the oxygen gas 15 by the low concentration gas 17, there is almost no outside air, etc., drawn in during the operation, and a highly pure oxygen can be maintained, which reaches to the center and deepest parts of the piercing hole 26 under formation, and an area with a highly pure oxygen is formed, and thereby, the formation of the piercing hole 26 in this area is promoted, and the piercing time is reduced. Due to this, use of a high output, continuous oscillation laser beam 14 is also possible, and a further reduction in the piercing time can be implemented. By shortening the piercing time, the heat input to the cut work 12 during the piercing operation can be reduced.

As a result, when moving form the piercing to the cutting operation, because the cause of incomplete cutting is eliminated, it is possible to stabilize cutting at the commencement of the cutting operation, and thereby it is possible increase the quality of the cut.

In addition, because the nozzle 11 formed by the concentric inner and outer gas nozzles 16 and 18 discharges gas from the outer gas nozzle 18 during cutting, sputter and molten metal adhering to both the inner and outer gas nozzles 16 and 18 can be prevented.

When the a blow nozzle which only discharges blow gas during piercing is provided separately from nozzle 11, in order to avoid the adhering of sputter and molten metal during the cutting operation, a drive mechanism for shunting this blow gas from the cutting nozzle is necessary, but in the nozzle 11 and the laser cutting apparatus according to the present embodiment, this kind of mechanism is unnecessary, and thus the cost can be reduced. However, in a blow nozzle which requires shunting, time for shunting after the completion of the piercing operation is necessary, but in the nozzle 11 and the laser cutting apparatus according to the present embodiment, this shunting time is unnecessary, and it is possible to move continuously to the cutting operation after completion of the piercing operation, and also has the advantage of being able to shorten the necessary time from piecing to completion of the cutting.

Moreover, the present invention is not limited to the above embodiments, and suitable alterations are possible.

For example, the flow control of the oxygen gas discharged from the inner gas nozzle and the flow control of the low concentration gas discharged form the outer gas nozzle can be connected, etc., and for control of the flow, concentration, etc., of the gas supplied and discharged towards the piercing position, various types of mechanism can be employed.

Figure 12:
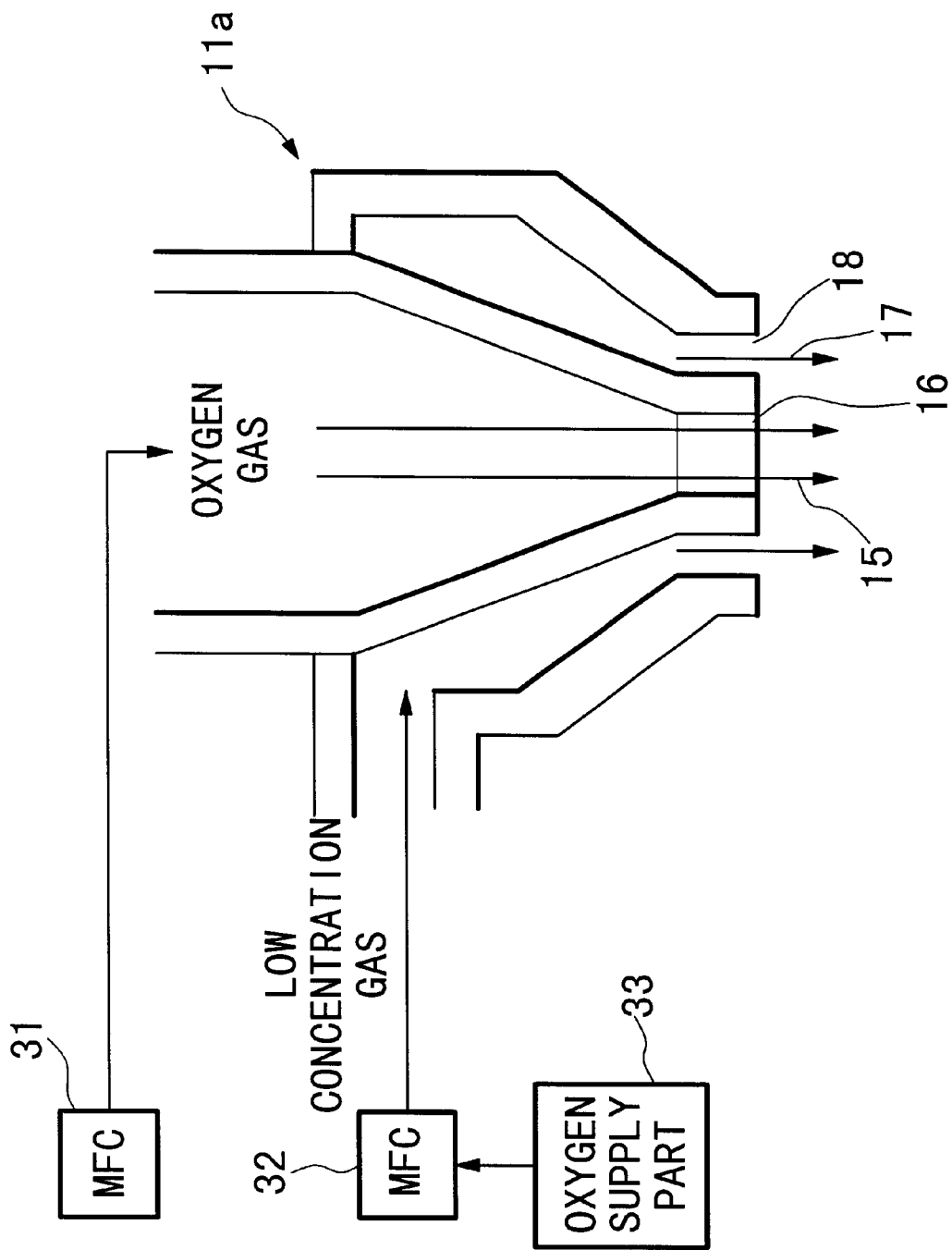
FIG. 12 is a frontal cross-section showing the laser processing nozzle providing the oxygen supplying part which mixes the oxygen with the low concentration gas discharged from the outer gas nozzle.
Figure 13:
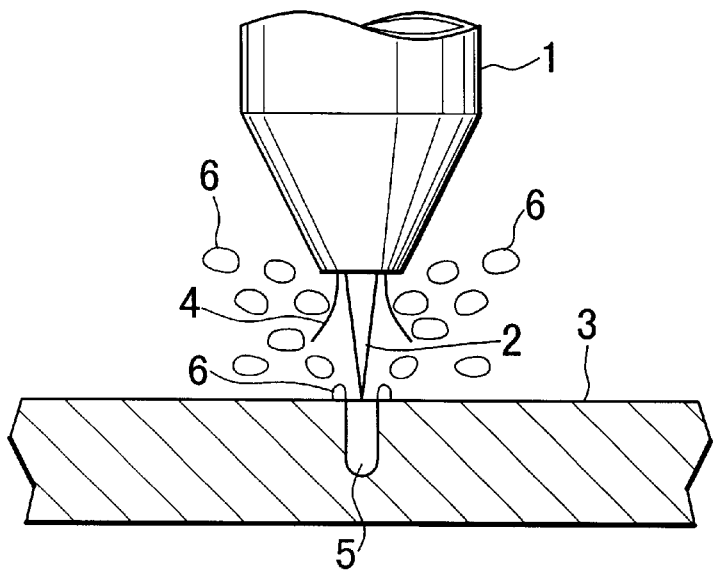
FIG. 13 is a frontal view showing a conventional example of a cutting nozzle.
Figure 14:
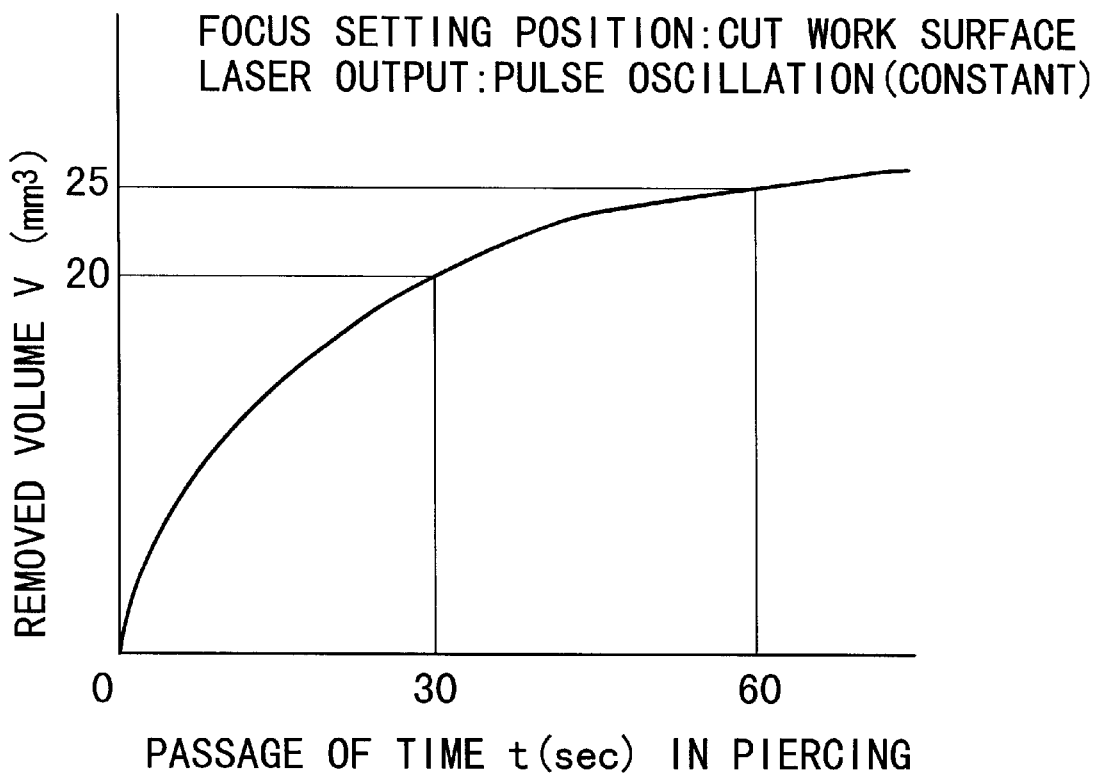
FIG. 14 is a graph showing the increase in the amount of molten metal removal which accompanies the progress of the piercing using a pulsed oscillation laser beam.

As shown in FIG. 12, an oxygen supply part 33 is connected to MFC 32 which supplies a low concentration gas 17 of the intended composition to the outer gas nozzle 18, and by sending oxygen gas from this oxygen supply part 33, it is possible to employ a construction which controls the nitrogen gas purity in the low concentration gas 17. However, if the minimum of the nitrogen concentration is 50%, concentrations greater than this can be maintained. In this case, the oxygen concentration within the low concentration gas 17 can also be adjusted, and thus, it is possible to control more finely the oxygen concentration distribution in the piercing hole 26 under formation. The oxygen supply part 33 can be the nitrogen concentration control mechanism.

In addition, the laser processing nozzle is not limited to a construction wherein the inner and outer gas nozzles 16 and 18 are formed in the same nozzle 11, and for example, it is possible to use a structure wherein a unit, wherein a nozzle hole corresponding to the outer gas nozzle is formed, can be attached and assembled on the outside of the cutting nozzle which forms the nozzle hole corresponding to the inner gas nozzle. In this case, the laser processing nozzle and laser cutting apparatus according to the present invention can adopted simply and at low cost to existing nozzles and laser cutting apparatuses.

What is claimed is:

1. A laser-cutting method comprising:
   piercing a cut work by supplying simultaneously a laser beam, a high purity oxygen gas, and a low concentration oxygen gas to said cut work from a laser processing nozzle provided with an inner gas nozzle and an annular-outer gas nozzle surrounding said inner gas nozzle; and cutting said cut work pierced by means of said laser beam by moving said laser processing nozzle with respect to said cut work in a direction parallel to the cut work, while supplying simultaneously said laser beam, said high purity oxygen gas, and said low concentration oxygen gas to said cut work from said laser processing nozzle, wherein said laser beam is supplied to said cut work from said inner gas nozzle, said high purity oxygen gas is supplied from said inner gas nozzle coaxially with the laser beam to said cut work, said low concentration oxygen gas comprises nitrogen gas, air, or a mixture thereof as major components and is supplied from said outer gas nozzle to said cut work in a direction inclined toward a center of said laser beam, and a focal position of said laser beam during piercing is set at a position deeper from the surface of said cut work than that during cutting.

2. A laser cutting method according to claim 1 further comprising the steps of applying an oil in advance to an intended piercing position of the cut work before an application of the laser beam.

3. A laser cutting method according to claim 1, further comprising the steps of changing the focal position for piercing according to the thickness of each cut work.

4. A laser cutting method according to claim 1, wherein a distance of separation for piercing between the laser processing nozzle provided said inner gas nozzle and said outer gas nozzle and the cut work differs from a distance of separation for cutting carried out subsequently.

5. A laser cutting method according to claim 4, wherein the distance of separation for piercing between the laser processing nozzle and the cut work is set larger than the distance of separation for cutting carried out subsequently, the focal position of said laser beam during piercing is set inside said cut work, and the focal position of said laser beam during cutting is set on the upper surface of said cut work.

6. A laser cutting method according to claim 1, wherein a distance from an upper surface of the cut work to a focal position for piercing is a range of about ½ t to 1t, wherein a thickness of the cut work is t.

7. A laser cutting method comprising:

piercing a cut work by supplying simultaneously a laser beam, a high purity oxygen gas, and a low concentration oxygen gas to said cut work from a laser processing nozzle provided with an inner gas nozzle and an annular outer gas nozzle surrounding said inner gas nozzle; and cutting said cut work pierced by means of said laser beam by moving said laser processing nozzle with respect to said cut work in a direction parallel to the cut work, while supplying simultaneously said laser beam, said high purity oxygen gas, and said low concentration oxygen gas to said cut work from said laser processing nozzle, wherein said laser beam is supplied to said cut work from said inner gas nozzle, said high purity oxygen gas is supplied from said inner gas nozzle coaxially with the laser beam to said cut work, said low concentration oxygen gas comprises nitrogen gas, air, or a mixture thereof as major components and is supplied from said outer gas nozzle to said cut work in a direction inclined toward a center of said laser beam, and a focal position of said laser beam during piercing is set at a position deeper from the surface of said cut work than that during cutting, and the distance between said laser processing nozzle and said cut work is set larger during piercing than during cutting.

8. A laser cutting method according to claim 7, further comprising the step of applying an oil in advance to an intended piercing position of the cut work before an application of the laser beam.

9. A laser cutting method according to claim 7, wherein a distance from an upper surface of the cut work to a focal position for piercing is a range of about ½ t to 1t, wherein a thickness of the cut work is t.

* * * * *